April 19, 1938.  E. C. BRISBANE ET AL  2,114,673
VALVE
Filed July 25, 1936   2 Sheets-Sheet 1

INVENTORS
EUGENE C. BRISBANE AND
ROBERT BISCHOFF
BY
Malcolm F. Bannett
ATTORNEY

April 19, 1938.  E. C. BRISBANE ET AL  2,114,673

VALVE

Filed July 25, 1936  2 Sheets-Sheet 2

INVENTORS
EUGENE C. BRISBANE AND
ROBERT BISCHOFF
BY
Malcolm F. Gannett
ATTORNEY

Patented Apr. 19, 1938

2,114,673

UNITED STATES PATENT OFFICE 2,114,673

VALVE

Eugene C. Brisbane and Robert Bischoff, York, Pa., assignors to S. Morgan Smith Company, York, Pa., a corporation of Pennsylvania Application July 25, 1936, Serial No. 92,554

3 Claims. (Cl. 74—22)

This invention relates to valves, and more particularly to the mechanism for opening and closing the valve.

An object of the invention is to provide an improved actuating mechanism for a plug valve of the type adapted to be raised, turned and reseated.

Another object of the invention is to provide an improved valve structure which includes a rotatable plug having a stem with a sleeve loosely mounted thereon, a plurality of gear sectors operatively associated with the sleeve and stem, and a plurality of pinions for operating the gear sectors in such a manner that the valve plug is first moved axially to unwedge the same, then rotated to its open or closed position, and then moved axially to rewedge the same.

Another object of the invention is to provide an improved valve mechanism of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
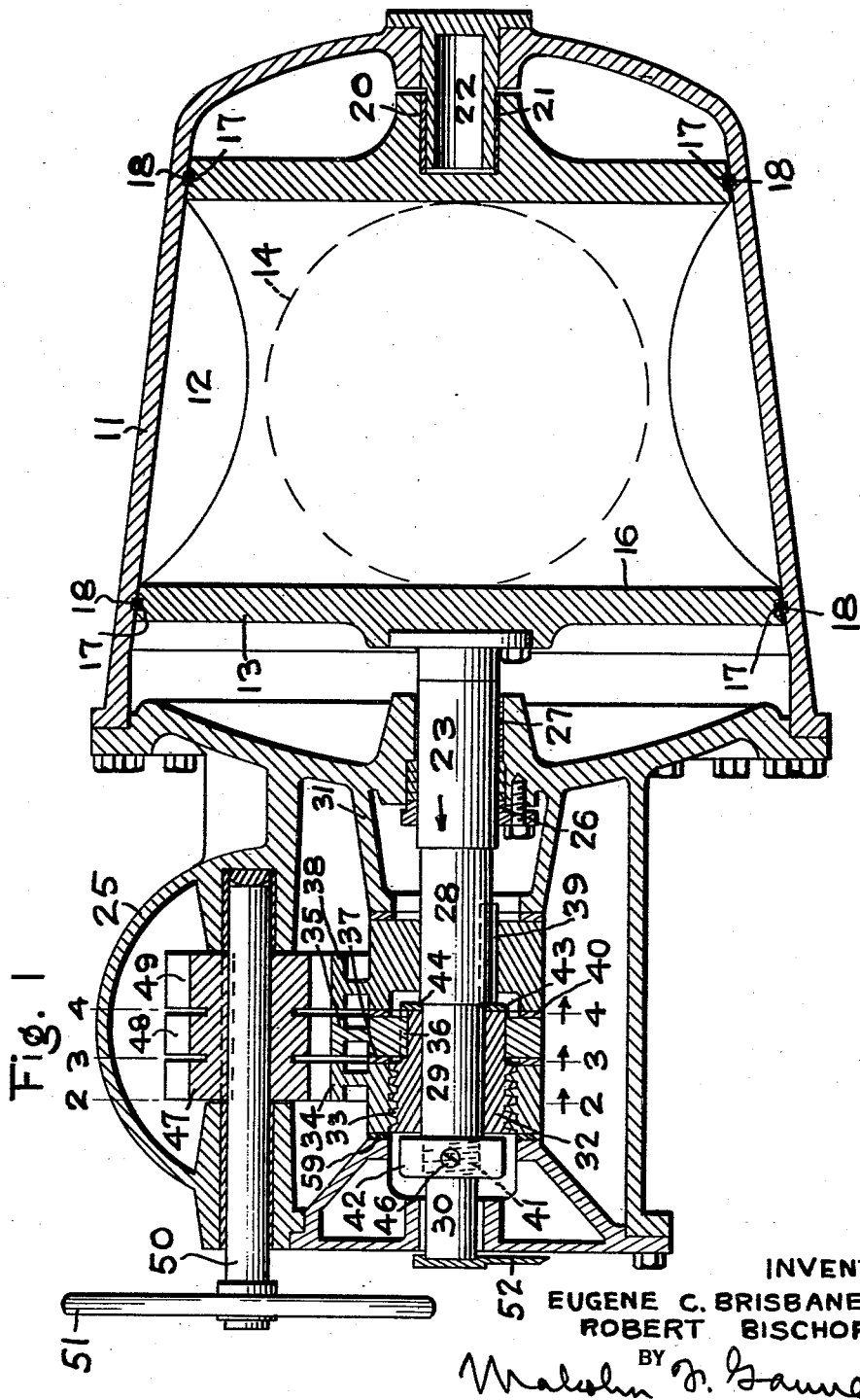
Figure 2:
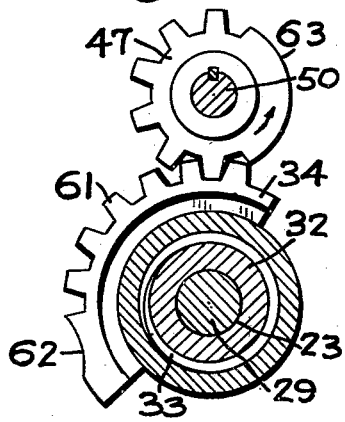
Figure 5:
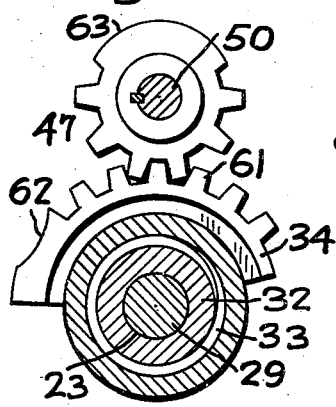
Figure 8:
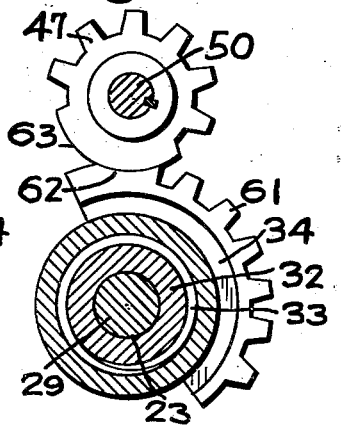
Figure 3:
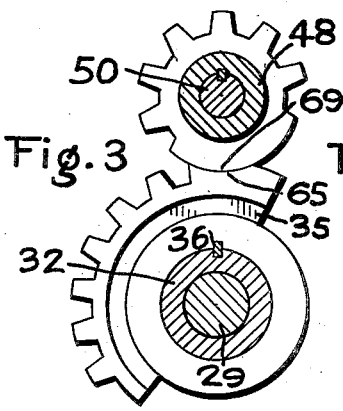
Figure 6:
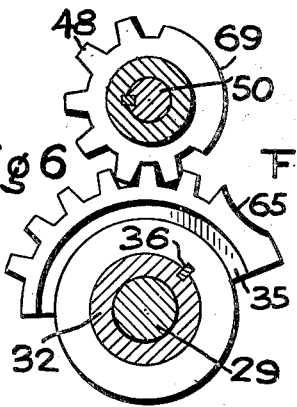
Figure 9:
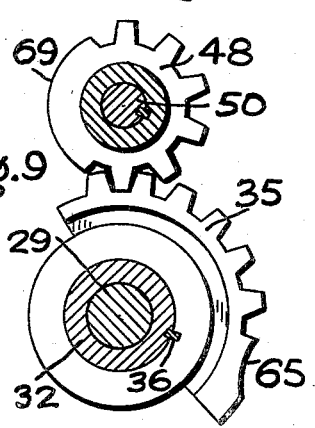
Figure 4:
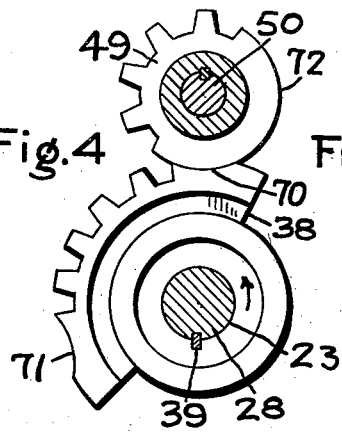
Figure 7:
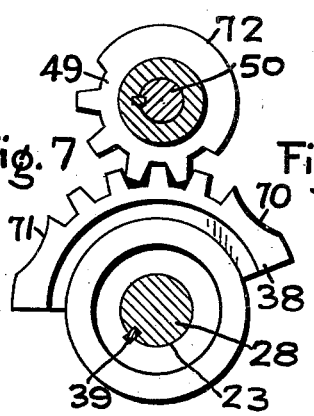
Figure 10:
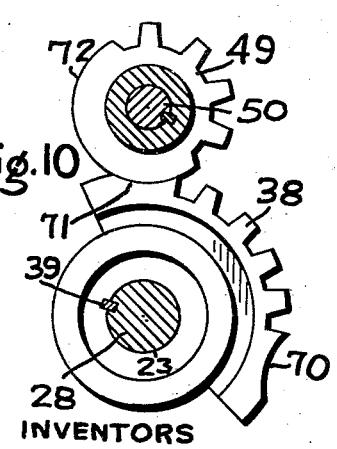

In the accompanying drawings:

Fig. 1 is a section through a valve embodying the present invention, the plug being shown in closed position;

Figs. 2–4 inclusive are diagrammatic views of the gear sectors and their associated pinions in valve closed and plug seated position;

Figs. 5–7 inclusive are diagrammatic views of the gear sectors and their associated pinions in valve plug rotating position; and Figs. 8–10 inclusive are diagrammatic views of the gear sectors and their associated pinions in valve open and plug seated position.

The drawings illustrate a straight-way valve, but the improvements are equally applicable to three or four way, elbow and angle valves.

The present invention relates to tapered plug valves, in which, during the operation of the valve, the conical plug is first unwedged from its seat by moving the plug in a straight line axially. After the plug is unseated, it is turned the desired angle to either its open or closed position. At the completion of the rotary movement, the plug is then moved axially and wedged or reseated. The plug operating mechanism includes three gears or sectors having teeth which are operated by three pinions so as to effect the three movements of the plug above referred to, i. e., first, the unwedging of the plug, second, the turning of the plug, and third, the reseating of the plug after it has been turned. The manner in which the valve operating mechanism is constructed and operated will now be described.

Referring to the drawings, the improved valve comprises a main body or casing 11 having a cavity 12 formed therein for a tapered plug 13, the cavity 12 being intersected by a longitudinal waterway or opening 14 which constitutes a passage through the valve. The plug 13 has a passage 16 formed therein of substantially the same diameter as the valve passage 14, so that when the plug 13 is in the open position, a uniform bore will extend through the valve from end to end.

The valve plug 13 may be equipped with seat rings 17 which are adapted to engage seat rings 18 mounted in the body 11 so as to provide a tight joint between the plug and the valve body when the plug is in either its open or closed position.

The tapered plug 13 is supported for both axial and rotary movement in the valve body 11.

At its inner or smaller end, the plug 13 is formed with an extension which constitutes a trunnion 20 having an opening 21 formed therein for the reception of a stem or spindle 22 projecting inwardly from the smaller end of the valve body 11.

At its outer or larger end, the plug 13 has secured thereto, one end of a shaft or stem 23 which extends through a web 24 of a housing 25 attached to the valve body 11, said web constituting a cover plate for the larger end of the valve body, and said housing 25 constituting a closure for the valve operating mechanism.

A packing gland 26, fastened to the outer side of the web 24, prevents leakage of fluid around the shaft 23.

A bushing 27 is mounted in the web 24 and surrounds the plug shaft 23. This bushing constitutes the main bearing for the shaft 23.

In the present instance, the valve shaft 23 is shown as being formed with a plurality of sections which successively decrease in diameter from the plug 13 outwardly. The inner or larger section of the valve shaft is indicated by reference numeral 23. The other sections 28, 29 and 30 are constructed of less diameters than the portion 23 for a purpose to be hereinafter more fully described.

Mounted on the portion 29 of the valve shaft is a sleeve 32 having a portion of its exterior formed with a screw thread 33. The sleeve 32 is free to turn on the valve shaft.

Mounted on the threaded portion 33 of sleeve 32 is a sector 34, whose purpose is to effect seating and unseating of the plug 13 during operation of the device as will be hereinafter described.

Also mounted on sleeve 32 is a second sector 35. As shown best in Figs. 3, 6 and 9, sector 35 is connected to the sleeve 32 by means of a sliding key 36 so that when the sector 35 is rotated or operated, the sleeve 32 will also be turned.

Interposed between sectors 34 and 35 is a washer 37, which serves as means for retaining the sectors 34 and 35 properly positioned on the sleeve 32.

Mounted on the section 28 of the valve shaft is a third sector 38 which is connected to said shaft by a key 39. The function of sector 38 is for turning the valve plug 13 from closed to open position and vice versa, and key 39 is a sliding key, by which axial movement of the valve shaft 23 is permitted during the operation of the device without imparting a similar movement to sector 38.

The hub of sector 38 is maintained spaced from the hub of sector 35 by a washer 40, and washers 59 and 60 are respectively interposed between the outer end of the hub of sector 34 and the adjacent wall of housing 25, and the inner wall of the hub of sector 38 and the adjacent end of hollow boss 31 projecting outwardly from the web 24.

The outer portion 30 of the valve shaft is formed with screw threads 41 for the reception of a nut 42.

A thrust washer 43 is interposed between the inner face of sleeve 32 and the shoulder 44 between sections 28 and 29 of the valve shaft, and a second thrust washer 45 is interposed between the outer face of sleeve 32 and the inner face of nut 42.

Nut 42 is screwed inwardly an amount to retain sleeve 32 in position on the portion 29 of the valve shaft, but nut 32 is not screwed in far enough to bear tightly against said sleeve, since the sleeve 32 should be free to turn on the shaft and should also be free to float up and down the shaft a slight distance, say .005 to .015 of an inch.

When the sleeve 32 has been properly positioned on the valve shaft, nut 42 is locked in place by means of a set screw 46.

Operatively associated with the three sectors 34, 35 and 38, are three pinions 47, 48 and 49, respectively. These pinions may be formed integrally from a single piece of suitable material which is mounted on a shaft 50 journalled in the housing 25. The teeth of the pinions are formed in a staggered relation to each other as shown clearly in Figs. 2, 3 and 4, for a purpose to be hereinafter described.

Any suitable means may be employed for operating the pinions 47, 48 and 49. In the present instance, one end of shaft 50 carries a hand wheel 51 which may be turned to effect operation of the plug as desired, such movement of the plug being indicated by a pointer 52 mounted on the outer end of shaft 23.

Each of the sectors are formed with a segment of teeth for meshing engagement with the teeth on their associated pinion, and said sectors are also formed with a plain or non-toothed segment, the purpose of which will be presently described.

The disposition of the toothed and non-toothed portions of the sectors is such that when the pinions 47, 48 and 49 are in one position, the teeth of certain sectors will be in meshing relationship with the teeth of the respective pinions, and other sectors will not have their teeth in mesh with teeth of the pinions, and when the pinions are moved from such position to another position the teeth of other of the sectors will be moved into meshing relationship with the teeth of the pinions so that said latter sectors will be actuated by said pinions.

Referring now to Figs. 2, 3 and 4, the arrangement and construction of the parts of the valve plug operating mechanism is such that when the valve is closed and the plug 13 seated, the teeth 61 of sector 34 are in mesh with the teeth of pinion 47. The disposition of sector 34 with respect to the pinion 47 in this position of the device is such that only a few of the sector teeth 61 are in mesh with the pinion teeth, so that when the pinion is rotated in the direction of the arrow Fig. 2, other teeth of the sector 34 will be made to mesh with other teeth of the pinion 47, and consequently the sector 34 will be turned a predetermined amount by the pinion. After the sector 34 has thus been rotated a predetermined amount, through the intermeshing of the teeth of pinion 47 with the sector teeth 61, the plain or untoothed portion 62 of the sector 34 will be presented to a plain face or untoothed portion 63 of the pinion 47 (see Fig. 8). The portion 62 of the sector 34 is in the form of an arcuate recess which engages the plain cylindrical face 63 of the pinion 47, as shown in Fig. 8. When the portion 62 thus engages the cylindrical portion 63 of the pinion 47, a stop is provided for preventing further rotation of the sector 34 by pinion 47.

As shown in Fig. 3, sector 35 is constructed in a reverse manner to the sector 34. That is to say, when the valve is closed and the plug 13 seated, an arcuate recess 65 beyond toothed portion of the sector is in engagement with a cylindrical face 69 on the pinion 48, and the teeth of the sector 35 are not in mesh with the teeth of the pinion 48. In this way sector 35 is locked by pinion 48 against rotation when the valve is closed and the plug is seated.

As shown in Fig. 3, the pinion 48 is so disposed on shaft 50 that the teeth thereof will not mesh with the teeth of sector 35 until after the shaft 50 has turned a predetermined amount. Due to the engagement of the cylindrical face 69 of the pinion 48 with the recess 65 of sector 35, the sector will remain stationary during the initial movement of the shaft 50 in the direction of the arrow, Fig. 3.

As shown in Fig. 4, sector 38 is formed with a comparatively short series of teeth which are disposed intermediate two arcuate recessed portions 70 and 71.

When the valve is closed and the plug 13 seated, recess 70 of sector 38 is in engagement with cylindrical surface 72 of pinion 49. As shown in Fig. 10, when the valve is open and the plug 13 seated, recess 71 of sector 38 is in engagement with the cylindrical surface 72 of pinion 49.

Sector 38 is keyed to the valve shaft, and consequently when the teeth of the sector are in meshing relationship with the teeth of pinion 49, the pinion rotates the sector a predetermined amount and the valve shaft fixed to said sector is rotated a predetermined angle, thereby turning the valve plug 13.

As shown in Figs. 3 and 4, the pinions 48 and 49 are similarly disposed on shaft 50. Since the sectors 35 and 38 are correspondingly positioned, when the shaft 50 has been rotated a predetermined amount in the direction of the arrow, Fig. 4, the teeth of pinions 48 and 49 will engage with the teeth of sectors 35 and 38, respectively, and thus both sectors 35 and 38 will be rotated in unison. However, since there are fewer teeth formed on sector 38 and pinion 49, than are formed on sector 35 and pinion 48, the teeth of sector 38 will unmesh from the teeth of pinion 49 prior to the completion of the rotary movement of shaft 50, and therefore, sector 38 will not be turned through as great an angle as is sector 35.

Since sector 35 is connected to the sleeve 32 by sliding key 36, rotation of sector 35 by its pinion 48 effects a corresponding rotation of the sleeve. Therefore, it will be noted that the purpose of sector 35 and its pinion 48 is to rotate sleeve 32.

When the recess 65 of sector 35 is in engagement with the cylindrical surface 69 of pinion 48, sector 35 is locked in position, and consequently sleeve 32 is held stationary. Accordingly, during the initial movement of shaft 50, due to the threaded engagement of sector 34 with the threads 33 of sleeve 32, the rotation of sector 34 about stationary sleeve 32 effects movement of the sleeve 32 longitudinally of the axis of shaft 23. However, since the sleeve 32 is prevented from moving longitudinally with respect to the valve shaft 23 by nut 42 and washer 45 at one end and washer 43 at the opposite end of said sleeve, obviously any longitudinal movement imparted to sleeve 32 by the sector 34, will cause a corresponding longitudinal or axial movement of valve shaft 23, and since plug 13 is fixed to shaft 23, the plug will also be moved longitudinally or axially in the valve body 11.

The construction and mode of operation of the parts is such that initial rotation of the pinions 47, 48 and 49 causes the valve shaft 23 and plug 13 to move in the direction of the arrow, Fig. 1, whereby the plug 13 is unwedged. After the shaft 50 has been rotated a predetermined amount and the plug 13 has thus been unwedged, the sectors 35 and 38 will be rotated by the pinions 48 and 49, respectively, and this results in both the valve shaft 23 and sleeve 32 being also rotated together with the sector 34. Since sector 34 and sleeve 32 are now simultaneously being rotated, there will not be any relative movement of sleeve 32 with respect to the threaded hub of sector 34 and consequently the valve plug 13 will remain in its unwedged position during the period it is being rotated by sector 38.

When the valve plug 13 has been rotated through a predetermined angle, the teeth of sectors 34 and 38 unmesh from the teeth of pinions 47 and 49, respectively, so that continued rotation of shaft 50 is ineffective in causing further rotation of the valve plug 13, through sector 38 and valve shaft 23, and sector 34.

However, since the teeth of sector 35 remain in meshing relationship with the teeth of pinion 48, sector 35 will continue to rotate after the rotation heretofore imparted to sectors 34 and 38 is halted. This continued rotation of sector 35 causes a corresponding continued rotation of sleeve 32, and due to the fact that sector 34 is now stationary, sleeve 32 is unscrewed from the threaded hub of sector 34 and the valve shaft 23 is now moved longitudinally or axially in the direction opposite to the arrow (Fig. 1), and consequently, the plug 13 is reseated or rewedged in the valve housing 11.

From the foregoing, it will thus be noted, that assuming that the valve plug 13 is in closed position as shown in Fig. 1, when it is desired to open the valve, the hand wheel 51 is turned so as to rotate pinions 47, 48 and 49 in a counter clockwise direction (Figs. 2, 3 and 4) and thus turn the sectors 34, 35 and 38 in a clockwise direction, with the result that the valve plug 13 is first unseated or unwedged, then rotated, and then seated or rewedged, as has been heretofore described, thereby opening the passage through the valve.

When it is desired to close the valve, the hand wheel 51 is turned in the opposite direction, and this action effects rotation of the sectors 34, 35 and 38 in a counter clockwise direction from their respective positions shown in Figs. 8, 9 and 10, to the positions shown in Figs. 2, 3 and 4, thereby operating the parts in an opposite direction from that described above so that the plug is closed and reseated, as shown in Fig. 1.

In the embodiment of the invention herein shown and described, the construction and operation of the valve is such that the plug is first moved in a straight line axially a predetermined distance through the operation of pinion 47 and sector 34, then the plug is turned through an angle of 90° through the operation of pinion 49 and sector 38. During the turning of the plug both of the sectors 34 and 35 rotate in unison with sector 38, and consequently the plug remains in its unwedged position. At the completion of the turning movement of the plug, sector 34 remains stationary with sector 38, and sector 35 continues to rotate an amount so that the plug is moved in a straight line axially towards its seat a distance equal substantially to the distance the plug was first moved away from its seat.

It will be understood that modifications can be made in the construction of the valve without departing from the scope of the invention.

Having thus described our invention, what we claim is:

1. Actuating means for a shaft adapted to be moved in a straight line a predetermined distance and then rotated at the completion of the reciprocating movement through a predetermined arc, comprising a sleeve having a smooth internal bore loosely mounted on the shaft and held against axial movement with respect to the shaft, a thread formed on a portion of the exterior of said sleeve, a gear having an internal threaded portion mounted on the threaded portion of said sleeve for moving said sleeve and the shaft axially when said gear is rotated, said gear having a toothed portion and an arcuate recessed portion, a second gear keyed to said sleeve for rotating the sleeve when the second gear is rotated, said second gear having a toothed portion and an arcuate recessed portion, a third gear keyed to said shaft for turning the shaft when said third gear is rotated, said third gear having a toothed portion and an arcuate recessed portion, three pinions for said three gears, each of said pinions having a cylindrical portion for engaging in the recessed portion of each gear during a portion of the rotation thereof to hold the gears against rotation, and a toothed portion on each of said pinions adapted to mesh with the toothed portions, respectively, of each of said gears to cause the same to be driven during a different portion of the rotation thereof, and means for simultaneously rotating all of said pinions.

2. Actuating means for a shaft adapted to be moved first in a straight line a predetermined distance, then rotated at the completion of the reciprocating movement through a predetermined arc and then moved back in a straight line the same distance it is first reciprocated, comprising a sleeve having a smooth internal bore loosely mounted on the shaft, a gear threaded on to said sleeve, a second gear keyed to said sleeve independent of the first gear, both of said gears being adapted to produce the reciprocating movements of said shaft, before and after the same is turned, a third gear keyed to the shaft for turning said shaft in alternate directions, and three pinions respectively operating said gears, each of said gears having arcuate recesses formed thereon and each of said pinions having cylindrical surfaces formed thereon for engagement with the arcuate recesses of said gears respectively whereby the shaft is held against rotation during a portion of the rotary movement of the sleeve and is positively rotated during another portion of said rotary movement.

3. Actuating means for a shaft adapted to be moved first in a straight line a predetermined distance, then rotated at the completion of the reciprocating movement through a predetermined arc and then moved back in a straight line the same distance it is first reciprocated, comprising a sleeve having a smooth internal bore loosely mounted on the shaft and held against axial movement with respect to the shaft, a thread formed on a portion of the exterior of said sleeve, a gear having an internal threaded portion mounted on the threaded portion of said sleeve, said gear having a toothed portion and an arcuate recessed portion at one end of the toothed portion, a second gear keyed to said sleeve, said second gear having a toothed portion and an arcuate recessed portion formed thereon at the opposite end of the threaded portion to the disposition of the recessed portion of said first gear, a third gear keyed to the plug shaft and having a toothed portion intermediate thereof and arcuate recessed portions on opposite sides of said toothed portion, three pinions, one for each of said gears, each of said pinions having a toothed portion meshing with the teeth of said gears and a cylindrical portion for engaging with the recessed portions of said gears during a portion of the rotation thereof to hold the gears against rotation, said gears being adapted to be driven by said pinions during a different portion of the rotation thereof, and means for simultaneously rotating all of said pinions.

EUGENE C. BRISBANE.
ROBERT BISCHOFF.